No. 787,104. PATENTED APR. 11, 1905.
F. G. MARBACH.
HONEY EXTRACTOR.
APPLICATION FILED JAN. 23, 1905.

4 SHEETS—SHEET 1.

Witnesses
Jas. E. Hutchinson
J. L. Lawlor

Inventor
Frank G. Marbach,
by Prindle and Williamson, Attorneys.

No. 787,104. PATENTED APR. 11, 1905.
F. G. MARBACH.
HONEY EXTRACTOR.
APPLICATION FILED JAN. 23, 1905.

4 SHEETS—SHEET 3.

Witnesses
Jas. E. Hutchinson.
J. L. Lawlor.

Inventor
Frank G. Marbach,
by Prindle and Williamson, Attorneys

No. 787,104. PATENTED APR. 11, 1905.
F. G. MARBACH.
HONEY EXTRACTOR.
APPLICATION FILED JAN. 23, 1905.
4 SHEETS—SHEET 4.
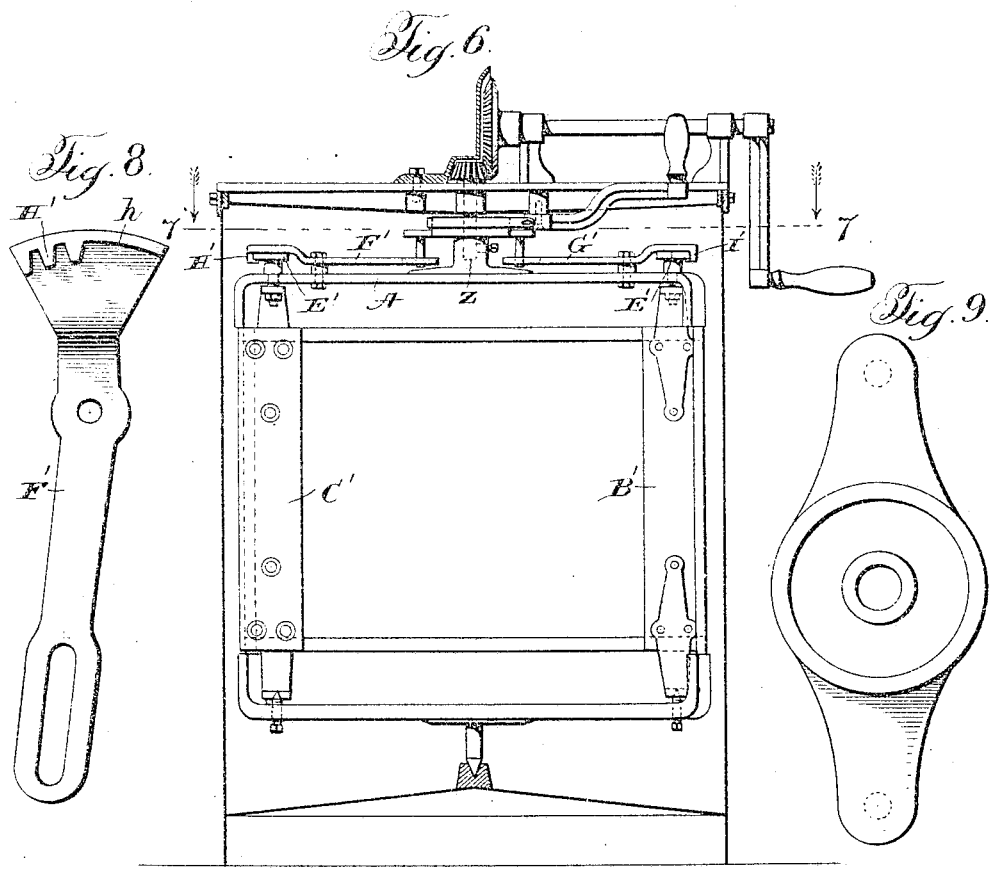
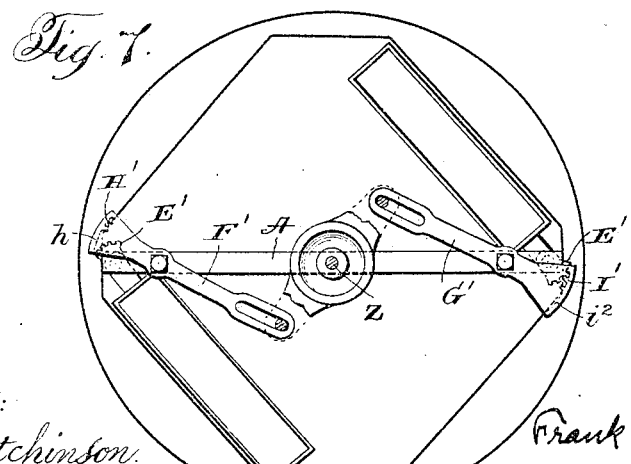
Witnesses:
Jas. E. Hutchinson
J. L. Lawlor
Inventor
Frank G. Marbach,
by Rindlaud Williamson, Attorneys No. 787,104.

Patented April 11, 1905.

UNITED STATES PATENT OFFICE.

FRANK G. MARBACH, OF MEDINA, OHIO, ASSIGNOR TO THE A. I. ROOT COMPANY, OF MEDINA, OHIO.

HONEY-EXTRACTOR.

SPECIFICATION forming part of Letters Patent No. 787,104, dated April 11, 1905.

Application filed January 23, 1905. Serial No. 242,373.

*To all whom it may concern:*

Be it known that I, FRANK G. MARBACH, of Medina, in the county of Medina, and in the State of Ohio, have invented a certain new and useful Improvement in Honey-Extractors; and I do hereby declare that the following is a full, clear, and exact description thereof, reference being had to the accompanying drawings, in which—

Figure 1:
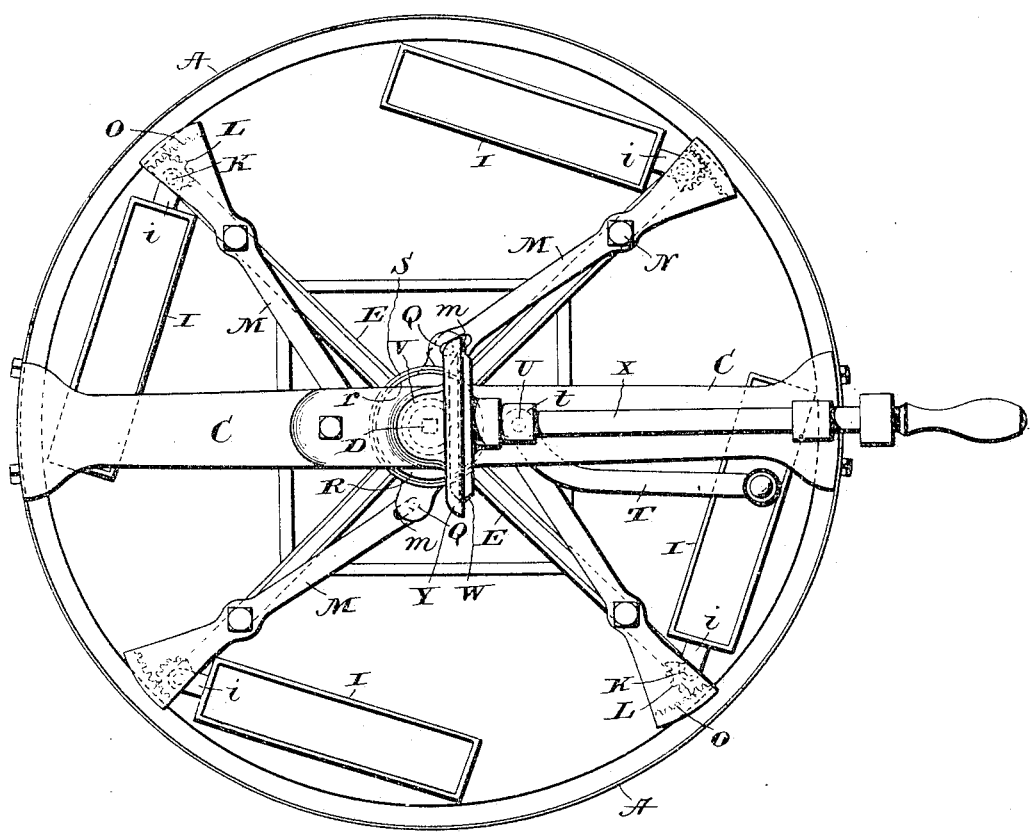
Figure 2:
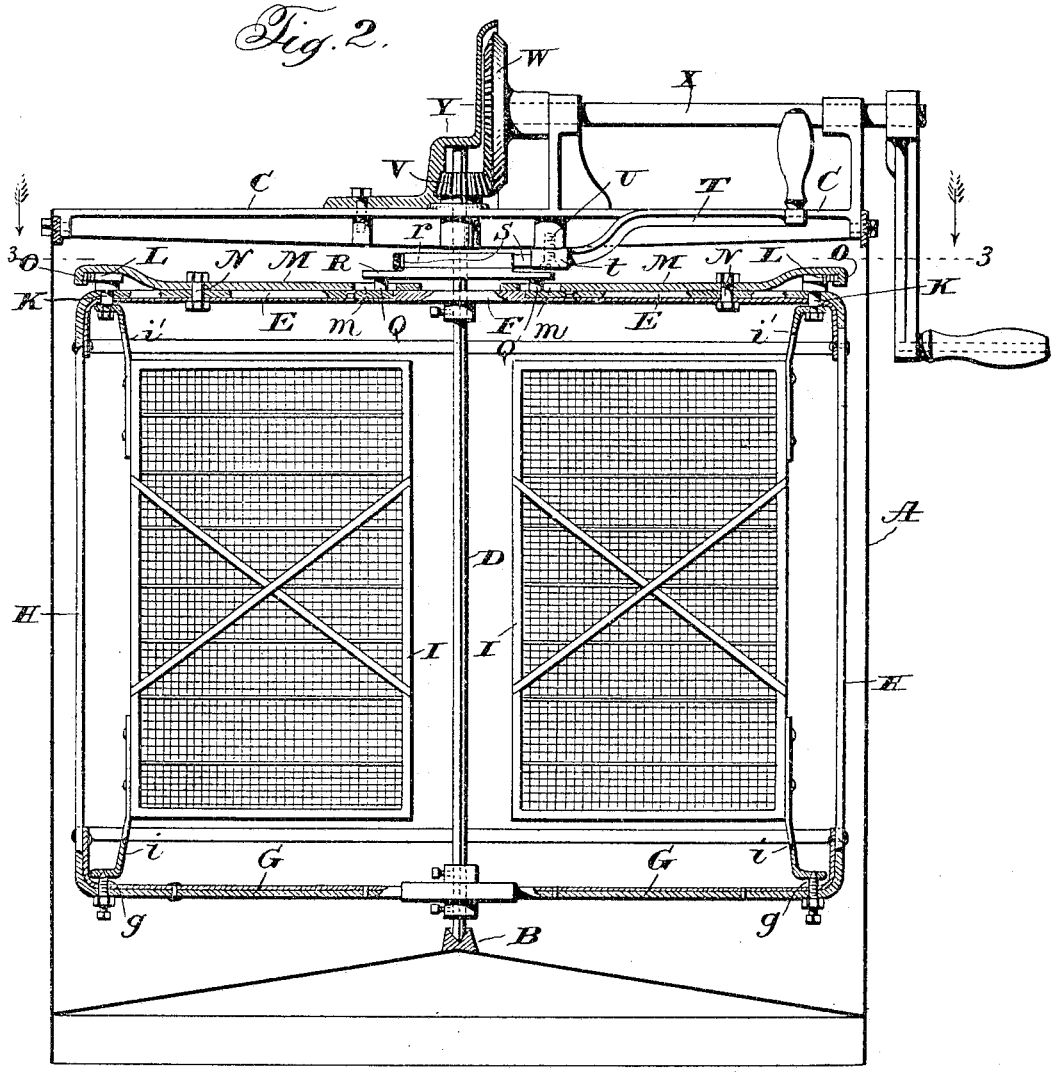
Figure 3:
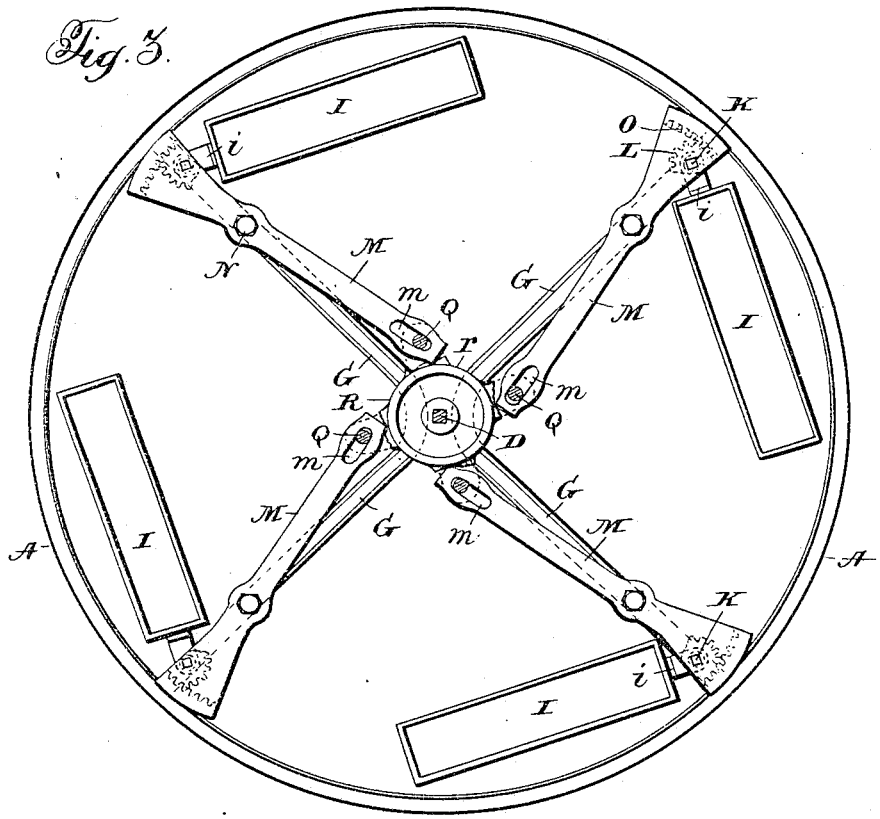
Figure 4:
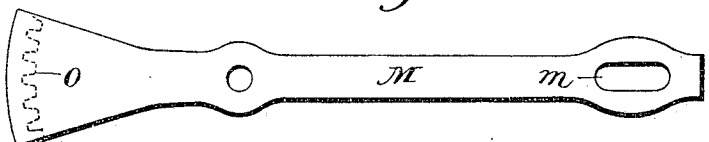
Figure 5:
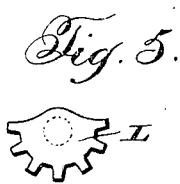

Figures 1 and 2 are respectively plan and vertical sectional views of a four-frame extractor embodying my invention, one position of the parts being indicated by dotted lines. Fig. 3 is a horizontal sectional view taken on the line 3 3 of Fig. 2. Figs. 4 and 5 are plan views of the segment levers and pinions; Fig. 6, a vertical sectional view of a two-frame extractor embodying my invention. Fig. 7 is a horizontal sectional view taken on the line 7 7 of Fig. 6, and Figs. 8 and 9 are plan views of the respective segment-levers illustrated in Fig. 6.

The object of my invention has been to provide an extractor for extracting honey from honeycombs, which extractor shall have any or all of the following advantages: that of being capable of reversing the frames while the extractor is in motion, so that by once setting the extractor in motion the honey may be extracted from both sides of a frame; that of permitting frame-baskets to be reversed without interference with each other, so that each of said baskets may extend past the center of the extractor, thus permitting the extractor to be made of less diameter than the combined width of the two opposite frames; that of having the gearing for reversing the baskets above the baskets and yet affording no obstruction to the mouths of the baskets; that will be simple in construction and efficient in operation; and to such ends my invention consists in the honey-extractor hereinafter specified.

In carrying my invention into practice, as illustrated in Figs. 1 to 5, inclusive, I provide a preferably cylindrical casing A. Such casing has a step-bearing B, centrally supported upon its bottom, and a cross-brace C, extending across its open upper end, a shaft D being journaled in a bearing formed in the said brace and having bearing in said step-bearing. Any desired number of arms E extend radially from a plate F, secured to the shaft D near its upper end, and a corresponding number of arms G being similarly supported from the lower end of the shaft, the respective pairs of arms being connected by vertical bars H. Rectangular baskets I for supporting the frames of honeycomb are pivoted to the outer ends of the arms F and G. A lower pivot may conveniently be formed by a hinge *i*, secured to a basket and having its lower end bent horizontally and provided with a conical hole which receives and rests upon the pointed upper end of a set-screw *g*, secured in the arm G. The upper pivot is formed, as illustrated, by a hinge *i'*, secured to the basket near its upper end, the upper end of the hinge being bent laterally and being clamped between a shoulder and a nut on the bolt K, that is journaled in a bearing formed in the outer end of the arm F. The upper end of the bolt has secured thereto a partial pinion L, such pinion having teeth, preferably, only on the portion of its periphery nearest the casing. A lever M is pivoted on a bolt N, secured in the arm E, and such lever extends over the pinion L and is provided with an internal segment O, that meshes with the teeth of the pinion L. The inner end of each lever M is provided with a slot *m*, that is engaged by a pin Q, the said pins being carried by a brake-hub R. The brake-hub is provided with a cylindrical surface *r*, preferably formed by a flange rising from the hub, and such surface is engaged by a brake-band S, whose ends are secured to the hub *t* of a brake-lever T, the said lever being pivoted upon a screw U on the brace C. The band is preferably lined with leather. Movement of the brake-lever draws the brake-band against the surface *r* and prevents the brake-hub and pins Q carried thereby from rotating. The upper end of the shaft D is provided with a bevel-pinion V, which is engaged by a bevel-gear W, that is carried by a crank-shaft X, the latter being mounted in bearings formed on the brace. A shield Y is conveniently provided to cover the pinion and gear.

In the operation of the extractor just described the frames having the honeycomb therein are placed in the baskets through the open upper ends of the latter, the honeycomb being first preferably sliced off at the sides to open the cells. The crank-shaft X is then rapidly rotated, and centrifugal force will cause the honey to leave the cells on the outer sides of the combs and fly off against the casing, the honey collecting in the lower part of the casing. When the honey has been completely extracted from the cells upon one side of the frames, the brake is applied by movement of the brake-lever, thus arresting the motion of the brake-hub and of the pins Q. The said pins by their engagement with the slots $m$ will arrest the inner ends of the levers M and cause their segments to rotate the pinions L, thus swinging the baskets simultaneously around until their opposite sides are outermost and exposing the cells on the opposite sides of the frames to centrifugal action. This operation may be performed without stopping the rotation of the shaft if the motion of the crank-shaft is in such a direction in the first place that the pins on the brake-hub were in their forward position, considered in the direction of such motion. If the pins on the brake-hub happen to be in their rearward position when the honey was extracted from the first side of the frames, it would of course be necessary to reverse the direction of rotation of the shaft C in order to reverse the position of the frames.

In the two-frame extractor illustrated in Figs. 6 to 10, inclusive, the construction is substantially the same as that illustrated in Figs. 1 to 5, except in the particulars hereinafter mentioned. The shaft Z, upon which the beveled pinion is mounted, does not extend below the cross-arm A, which supports the upper pivots of the two baskets, and the baskets C' and B' are wide enough so that they extend beyond the axis of the shaft Z. As the baskets would interfere with each other in attempting to swing past each other at the same time in being moved to reversed position, I provide the following mechanism for reversing the baskets at different times. Each basket carries a partial pinion E', corresponding with the pinions L in the four-frame extractor. Levers F' and G' are provided for the baskets B' and C', respectively, the said levers being provided with internal segments H' and I', respectively. The said segments are, however, cut away along the portions $h$ and $i^2$, respectively, so that the segment H' is inactive until the segment I' has swung its basket past the center, and the segment I' is inactive while the segment H' is swinging its basket to reversed position. The levers F' and G' are operated by pins upon a brake-hub in the same manner as the corresponding levers in the four-frame extractor.

It will be seen that my extractor can be set in motion and the honey extracted from one side of the frames and that the frames can then be reversed without stopping the motion originally given to the machine and the honey extracted from the opposite sides of the frames. I am thus enabled to extract the honey with less expenditure of time and power than is possible with the machines previous to mine, which required that the machine be stopped in order to reverse the frame. By the arrangement of the reversing-gearing the segment ends of the segment-levers swing away from the baskets as the baskets pass to final position, and thus swing away from over the entrances to the baskets and leave them unobstructed for the insertion of the frames. This is due to the fact that the internal segment is used instead of an external segment, but of course other gearing could accomplish the same purpose. By providing means for reversing the baskets at different times I am able to make the extractor-casing of much less diameter than would be necessary if the baskets could not swing past the center of the main shaft.

It is obvious that various changes can be made in the above-illustrated construction, and I do not desire to be limited beyond the language of my claims and the requirements of the prior art. For instance, instead of the pin-and-slot connection between the reversing-levers and the brake-hubs gear-teeth can be formed on both parts with the same effect.

Having thus described my invention, what I claim is—

1. In a honey-extractor, the combination of a revoluble support having baskets pivoted thereto, and means for reversing said baskets, one after another, while said support is rotated.

2. In a honey-extractor, the combination of a revoluble support having baskets pivoted thereto, of pinions carried by said baskets, and means for causing the rotation of said pinions, independently of said support, or not, at will, during the rotation of said support.

3. In a honey-extractor, the combination of a revoluble support having baskets pivoted thereto, pinions secured to said baskets, and means whereby teeth on the outer portions of the peripheries of said pinions may be caused to rotate, or not, while said support is rotating.

4. In a honey-extractor, the combination of a revoluble support having baskets pivoted thereto, pinions secured to said baskets, levers pivoted to said support, said levers having internal segments engaging the outer portions of the peripheries of said pinion, and means for arresting the rotation of the inner ends of said levers during the rotation of said support.

5. In a honey-extractor, the combination of a revoluble support having baskets pivoted thereto, pinions secured to said baskets, levers pivoted to said support, said levers having internal segments engaging the outer portions of the peripheries of said pinions, and means for arresting the rotation of the inner ends of said levers during the rotation of said support, said means comprising a hub carrying projections that engage recesses in said levers.

6. In a honey-extractor, the combination of a revoluble support having baskets pivoted thereto, pinions secured to said baskets, levers pivoted to said support, said levers having internal segments engaging the outer portions of the peripheries of said pinions, and means for arresting the rotation of the inner ends of said levers during the rotation of said support, said means comprising a hub carrying pins that engage slots in said levers.

7. In a honey-extractor, the combination of a revoluble support having baskets pivoted thereto, pinions secured to said baskets, levers pivoted to said support, said levers having internal segments engaging the outer portions of the peripheries of said pinions, means for arresting the rotation of the inner ends of said levers during the rotation of said support, said means comprising a hub carrying pins that engage slots in said levers, and a brake adapted to hold said hub from rotation.

8. In a honey-extractor, the combination of a revoluble support having baskets pivoted thereto, pinions secured to said baskets, levers pivoted to said support, said levers having internal segments engaging the outer portions of the peripheries of said pinions, means for arresting the rotation of the inner ends of said levers during the rotation of said support, said means comprising a hub carrying pins that engage slots in said levers, and a brake adapted to hold said hub from rotation, said brake comprising a brake-band that embraces said hub and a lever pivoted on a stationary part of the machine and adapted to draw said band against said hub.

9. In a honey-extractor, the combination of a revoluble support, having baskets pivoted thereto, means carried by said support for reversing said baskets, said means comprising levers projecting toward the center of rotation of said support, said means being operable by arresting the inner ends of said levers from rotation.

10. In a honey-extractor, the combination of a revoluble support having baskets pivoted thereto, levers pivoted on said support and having connections whereby said baskets may be reversed by the swinging of the inner ends of said levers, said inner ends being provided with slots, a hub having pins adapted to engage said slots, and means for causing relative rotation of said hub and support.

11. In a honey-extractor, the combination of a revoluble support having baskets pivoted thereto, levers pivoted on said support and having connections whereby said baskets may be reversed by the swinging of the inner ends of said levers, said inner ends being provided with slots, a hub having pins adapted to engage said slots, and means for causing relative rotation of said hub and support, said means comprising a brake adapted to engage said hub.

12. In a honey-extractor, the combination of a revoluble support having baskets pivoted thereto, levers pivoted on said support and having connections whereby said baskets may be reversed by the swinging of the inner ends of said levers, said inner ends being provided with slots, a hub having pins adapted to engage said slots, and means for causing relative rotation of said hub and support, said means comprising a brake adapted to engage said hub, said brake comprising a band adapted to embrace said hub, and a lever pivoted upon a stationary part of the frame for drawing said band against said hub.

13. In a honey-extractor, the combination of a revoluble support having baskets pivoted thereto, of pinions carried by said baskets, and means for causing the rotation of said pinions, one after another, independently of said support or not, at will, during the rotation of said support.

14. In a honey-extractor, the combination of a revoluble support having baskets pivoted thereto, pinions secured to said baskets, and means whereby teeth on the outer portions of the peripheries of said pinions may be caused to rotate, one after another, or not, while the support is rotated.

15. In a honey-extractor, the combination of a revoluble support having baskets pivoted thereto, pinions secured to said baskets, levers pivoted to said support, said levers having internal segments engaging the outer portions of the peripheries of said pinions, and means for arresting the rotation of the inner ends of said levers during the rotation of said support, said segments being so positioned as to engage said pinions at different times.

16. In a honey-extractor, the combination of a revoluble support having baskets pivoted thereto, pinions secured to said baskets, levers pivoted to said support, said levers having internal segments engaging the outer portions of the peripheries of said pinions, and means for arresting the rotation of the inner ends of said levers during the rotation of said support, said segments being so positioned that one of them shall engage its pinion before another engages its corresponding pinion.

17. In a honey-extractor, the combination of a revoluble support having baskets pivoted thereto, pinions secured to said baskets, levers pivoted to said support, said levers having internal segments engaging the outer portions of the peripheries of said pinions, and means for arresting the rotation of the inner ends of said levers during the rotation of said support, said segments being so positioned that one of them shall engage its pinion before another engages its corresponding pinion, said means for arresting said lever comprising a hub carrying projections that engage recesses in said levers.

18. In a honey-extractor, the combination of a revoluble support having baskets pivoted thereto, pinions secured to said baskets, levers pivoted to said support, said levers having internal segments engaging the outer portions of the peripheries of said pinions, and means for arresting the rotation of the inner ends of said levers during the rotation of said support, said segments being so positioned that one of them shall engage its pinion before another engages its corresponding pinion, said means for arresting said lever comprising a hub carrying pivots that engage slots in said levers.

19. In a honey-extractor, the combination of a revoluble support having baskets pivoted thereto, pinions secured to said baskets, levers pivoted to said support, said levers having internal segments engaging the outer portions of the peripheries of said pinions, and means for arresting the rotation of the inner ends of said levers during the rotation of said support, said segments being so positioned that one of them shall engage its pinion before another engages its corresponding pinion, said means for arresting said lever comprising a hub carrying pivots that engage slots in said recesses, and a brake adapted to hold said hub from rotation.

20. In a honey-extractor, the combination of a revoluble support having baskets pivoted thereto, pinions secured to said baskets, levers pivoted to said support, said levers having internal segments engaging the outer portions of the peripheries of said pinions, and means for arresting the rotation of the inner ends of said levers during the rotation of said support, said segments being so positioned that one of them shall engage its pinion before another engages its corresponding pinion, said means for arresting said lever comprising a hub carrying pivots that engage slots in said recesses, and a brake adapted to hold said hub from rotation, said brake comprising a brake-band that embraces said hub, and a lever pivoted on the stationary part of the machine and adapted to draw the said band against said hub.

21. In a honey-extractor, the combination of a revoluble support having baskets pivoted thereto, means carried by said support for reversing said baskets, one after another, said means comprising levers projecting toward the center of rotation of said support, said means being operable by arresting the inner ends of said levers from rotation.

In testimony that I claim the foregoing I have hereunto set my hand.

FRANK G. MARBACH.

Witnesses:
FRANK SPELLMAN,
J. T. CALVERT.